Aug. 13, 1929.   S. C. ANKER-HOLTH   1,724,587
FISH CLEANING MACHINE
Filed May 28, 1928   4 Sheets-Sheet 2

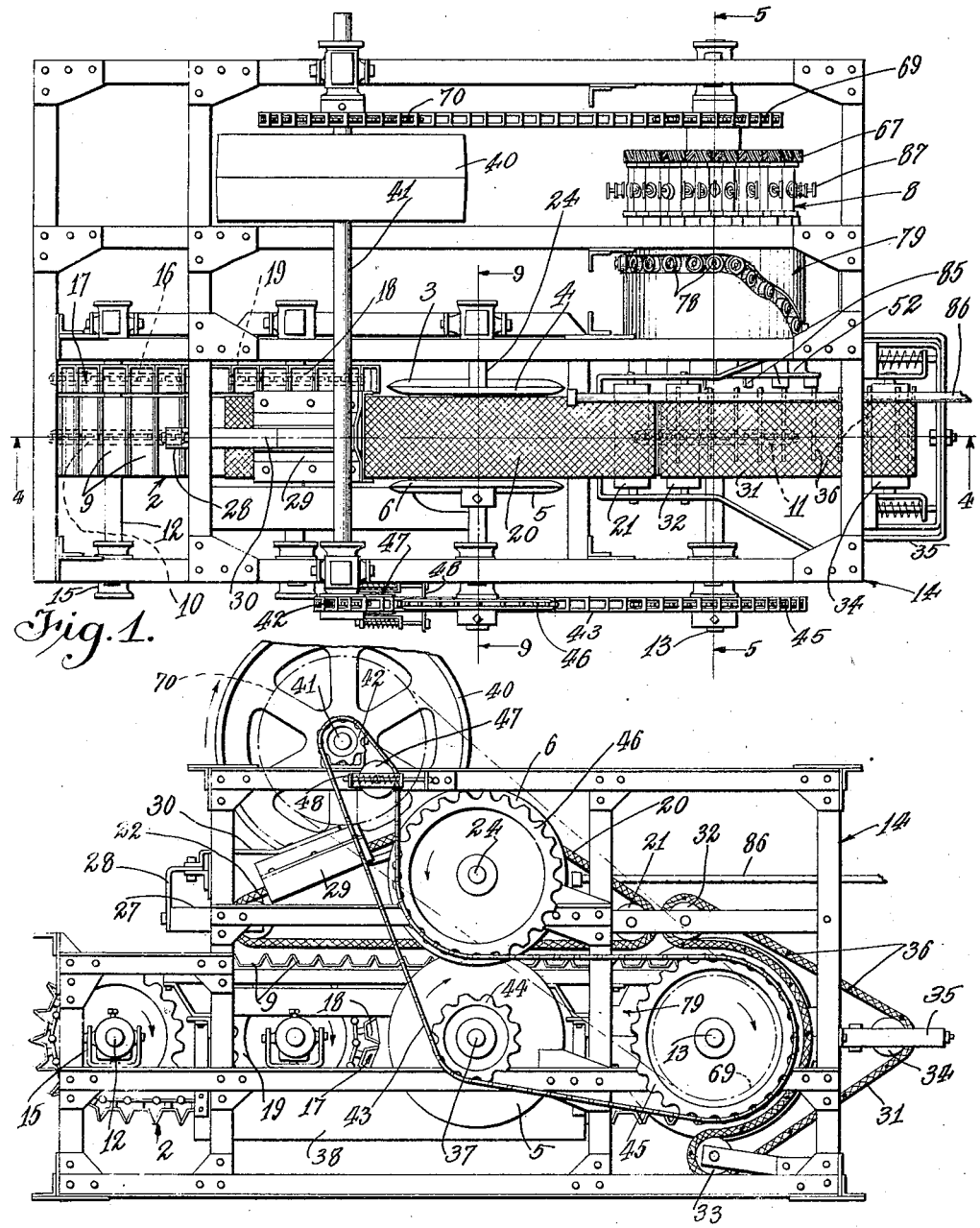

Inventor
Severin C. Anker-Holth
By Lyon & Lyon
Attorneys

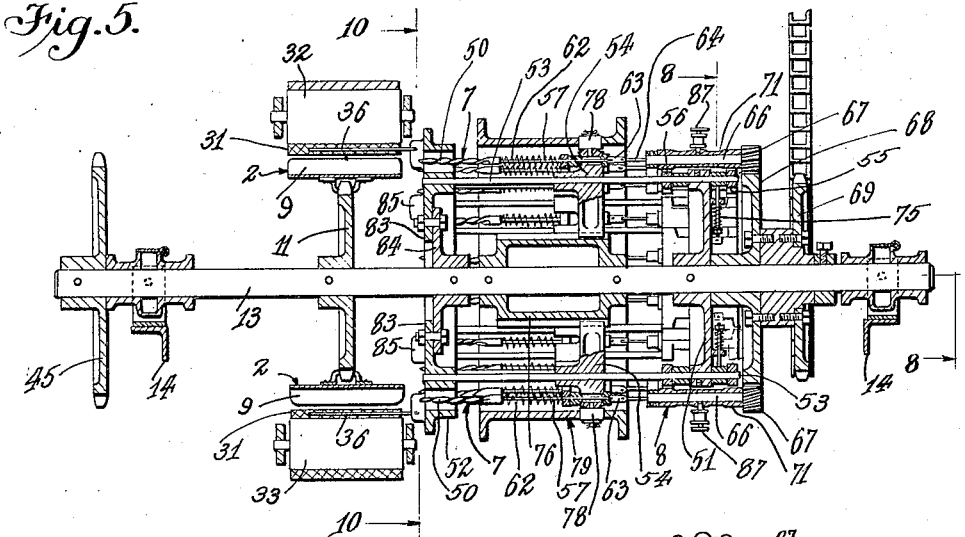
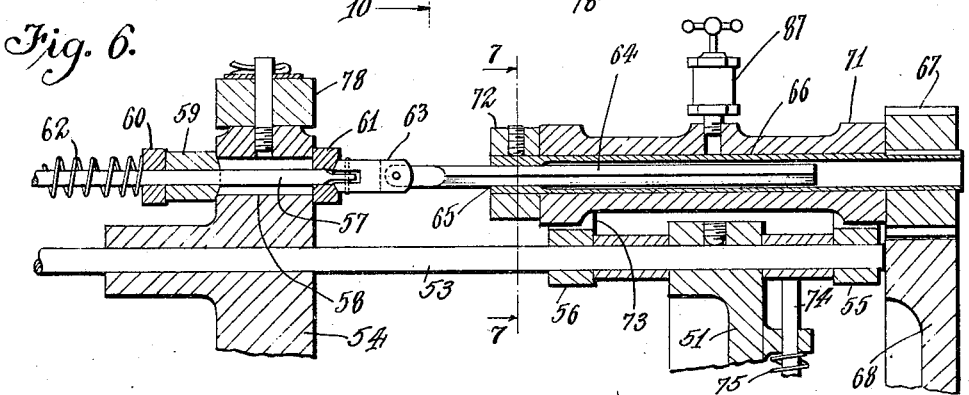
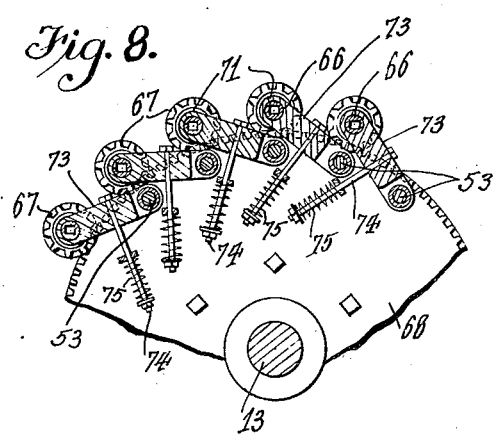

Aug. 13, 1929.  S. C. ANKER-HOLTH  1,724,587
FISH CLEANING MACHINE
Filed May 28, 1928  4 Sheets-Sheet 4

Inventor
Severin C. Anker-Holth
By Lyon & Lyon
Attorneys

Patented Aug. 13, 1929.

1,724,587

UNITED STATES PATENT OFFICE.

SEVERIN C. ANKER-HOLTH, OF LOS ANGELES, CALIFORNIA, ASSIGNOR TO CALIFORNIA PACKING CORPORATION, OF SAN FRANCISCO, CALIFORNIA, A CORPORATION OF NEW YORK.

FISH-CLEANING MACHINE.

Application filed May 28, 1928. Serial No. 281,093.

This invention relates to a fish cleaning machine.

An object of the present invention is to provide a fish cleaning machine with a means for conveying an entrail removing member in synchronism with the motion of a conveyor which holds the fish to be cleaned, so that the machine is capable of continuous and uninterrupted operation. The machines heretofore employed for cleaning fish have generally required the use of entrail removing means which do not penetrate into the visceral cavity of the fish or have required that the fish holding means be subjected to a step by step motion in order that the fish holding means be stationary during the operations of the entrail removing member. When the entrail removing member does not properly enter the visceral cavity of the fish, the cleaning operation is imperfect. When the fish holding means must be stopped each time the entrail removing member operates upon the fish, the capacity of the machine is very low. The present invention provides a means by which the fish may be completely cleaned in a machine having a large capacity.

A further object of the present invention is to provide a fish cleaning machine in which the entrail removing member or members are constructed to enter properly the visceral cavity of the fish, even when the fish are presented in different positions near the entrail removing member. By a machine of the present invention, it is unnecessary to accurately position fish in a predetermined position in the fish holding members of the machine. This permits the machine to be fed by mechanical means or in case of manual feeding of the machine, simplifies this feeding.

Another object of the present invention is to provide a fish cleaning machine with a fish holding conveyor and with an improved form of belt operative for holding the fish in the conveyor during the cleaning operations.

Various further objects and advantages of the invention will be found more fully described from a description of a preferred form or example of a fish cleaning machine embodying the invention.

For this purpose, there is hereafter described with reference to the accompanying drawings, one form or example of a machine embodying the present invention.

In the drawings:

Figure 1 is a plan view of the fish cleaning machine.

Figure 2 is a side elevation of the machine.

Figure 5 is a vertical section on the line 5—5 of Figure 1, taken through the mechanism for operating the entrail removing members.

Figure 6 is an enlarged fragmentary section of one of the entrail removing members and its operating mechanism.

Figure 7 is a section on the line 7—7 of Figure 6.

Figure 8 is a fragmentary section on the line 8—8 of Figure 5.

Figure 3:
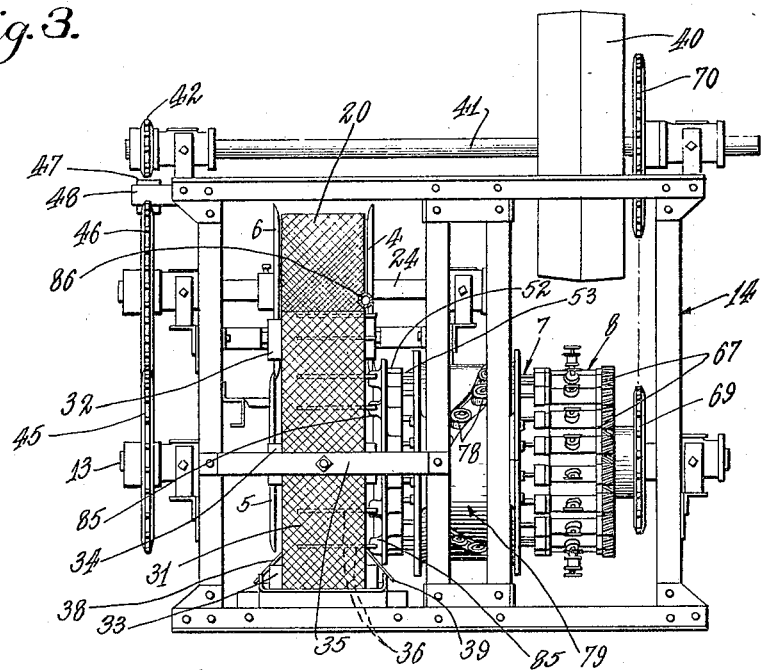
Figure 3 is a rear elevation.
Figure 4:
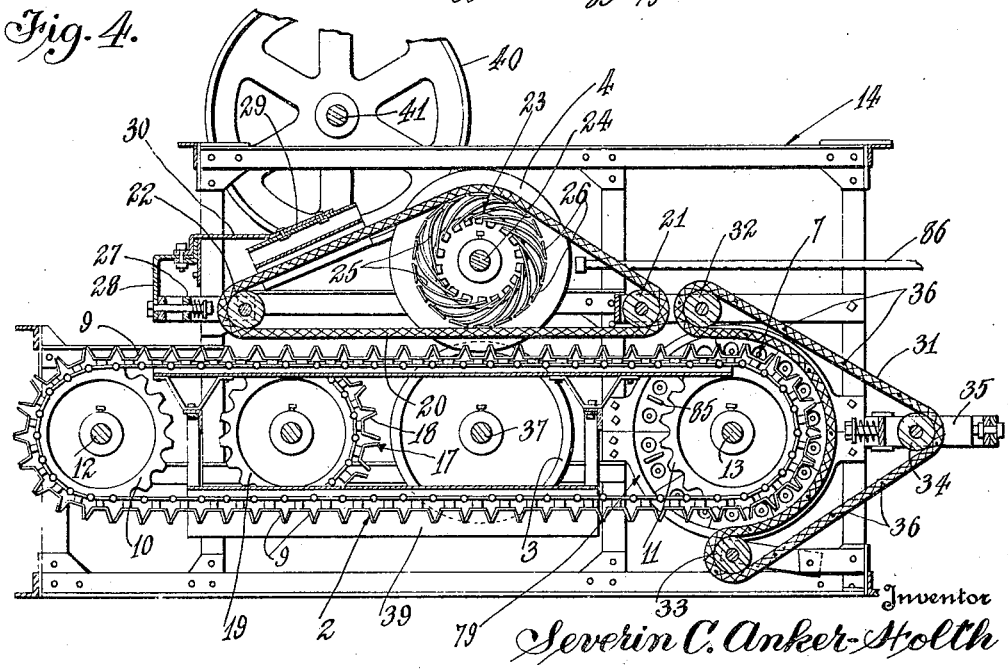
Figure 4 is a vertical section on the line 4—4 of Figure 1.

Referring to the drawings: The fish cleaning machine is illustrated as comprising, as major elements, a conveyor 2 for holding the fish to be cleaned, two pairs of disc knives 3, 4 and 5, 6 positioned to operate at opposite sides of the conveyor for removal of the heads and tails of the fish and a plurality of entrail removing members 7 mounted by means, such as a turret 8 for conveying the entrail moving members together with the movement of the conveyor 2 so that the entrail moving members may operate upon the fish while the fish are being continuously moved by the conveyor 2.

The conveyor 2 is formed with a plurality of fish receiving or holding member 9, preferably of the size to receive a single fish of the kind operated upon. The conveyor 2 is mounted to travel around the sprockets 10 and 11 mounted upon shafts 12 and 13 respectively. The shafts 12 and 13 are journaled in the frame 14 of the machine which is here shown to be made of angle iron. The shaft 12 is journaled in adjustable bearing bracket 15 adapted to be adjusted for properly tightening the conveyor 2. Mounted upon the shaft 12 is an additional sprocket wheel 16 which drives a supplemental conveyor 17, the other end of which passes around a sprocket wheel 19 journaled near the front center of the frame. The conveyor 17 is provided with holding members or cups 18 which support the head of the fish which overhangs the fish holders 9 of the conveyor 2 before these heads are severed from the fish. The conveyor 17 thus provides a means for preventing the fish from sliding out of the conveyor 2.

The fish cleaning machine also includes a belt 20 which serves as a means for holding the fish within the fish receiving members 9 during the operations of cutting the heads and tails from the fish. The belt 20 is preferably constructed of wire mesh and is shown as having its bottom portion spaced slightly above the top of the conveyor 2 and parallel with it, belt 20 passes over rollers 21 and 22 suitably journaled in the frame 14 of the machine and also passes over a belt driving member 23. The belt driving wheel 23 is mounted upon the shaft 24 journaled in the upper part of the frame and the driving member 23 is composed of a plurality of plate spring members 25 bent backwardly from the direction of rotation of the shaft 24 and connected at their outer ends with belt engaging plates 26. The belt driving wheel 23 thus provides a means for placing tension upon the belt, maintaining the same tight during operation. The roller 22 is preferably journaled in a bracket 27 having a yielding support from the bracket 28, fixed to the frame 14 to provide an additional means for applying the pressure for tightening the belt 20. There is also provided a guide 29 for the belt 20, supported by the frame 14 from a bracket 30.

There is also provided an additional fish holding belt 31 covering the fish in the conveyor 2 throughout that portion of the conveyor at which the fish in the conveyor are operated upon by the entrail removing members 7. The belt 31 being trained over the curved portion of the conveyor at the rear end of the machine. For this purpose, the belt 31 is indicated as passing around a roller 32 above the conveyor near the rear end, a roller 33 below the conveyor near the rear end, and a rear roller 34 which is illustrated as mounted in a bracket 35, yieldingly supported at the rear end of the frame 14, so that the roller 34 operates as a means for applying tension to the rear belt 31. The belt 31 is also preferably composed of wire mesh and is provided with a number of rods 36 or other means by which the belt 31 may be driven in accurate synchronism with the motion of the conveyor 2. The driving means for the belt 31 is hereinafter pointed out in connection with the description of the turret 8.

Figure 9:
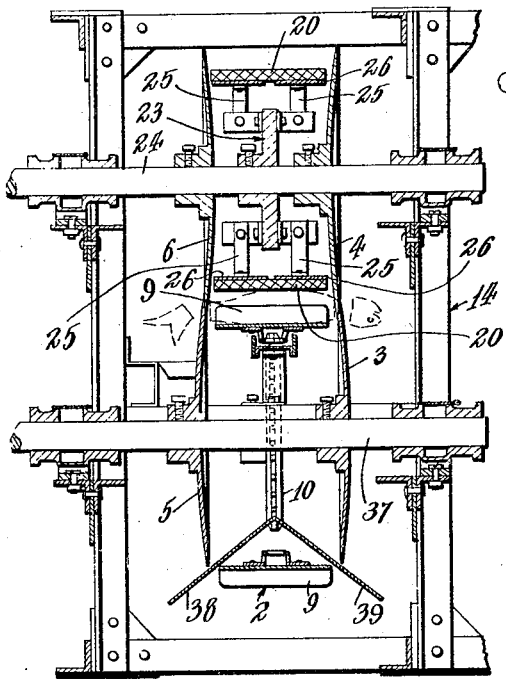
Figure 9 is a vertical section on the line 9—9 of Figure 1.

The shaft 24 which mounts the forward fish holding belt 20, also mounts the upper cutting discs 4 and 6. The lower cutting discs 3 and 5 of the machine are supported upon a shaft 37, journaled to the frame 14 and the discs 4 and 6, adjacent the fish receiving members 9 of the conveyor 2, thereby providing means by which the head and tail of the fish may be readily severed as the fish are conveyed by the meeting edges of the knives 3, 5, 4, and 6 (see Fig. 9). Below the knives 3 and 5, there is indicated baffle plates 38 and 39 for discharging the heads and tails of the fish outwardly from the center of the machine.

For driving the parts of the machine hereinbefore described, a belt pulley 40 is journaled on a shaft 41 at the top of the frame 14 and said shaft 41 carries, at the side of the frame, a sprocket 42, around which is trained a driven chain 43 which passes around a sprocket 44 on the shaft 37 carrying the lower discs 3 and 5. The driving chain 43 also is trained around sprocket 45 on the shaft 13 on which the rear sprocket 11 of the conveyor 2 is mounted. The driving chain 43 is also trained around a sprocket 46 fixed to the shaft 24 to which are secured the upper driving discs 4 and 6 and the driving wheel 23 of the belt 20. The driving chain 43 also passes around a chain tightening roller 47 mounted by bracket 48, having a yielding connection with the frame 14. There are thus driven by the driving chain 43, the disc knives 3, 5, 4 and 6, the conveyor 2, the driving wheel 23 of the belt 20 and also the supplemental conveyor 16.

The entrail removing members 7 preferably are formed at their ends with extracting augers, preferably formed by twisted plates 50. These entrail removing members are provided with; first, means for revolving the same in operation; second, means for advancing and retracting same in and from the visceral cavity of the fish to be cleaned; third, with means for moving the same in synchronism with the motion of the fish holding conveyor 2, during that portion of the operation in which they are acting upon the fish supported by said conveyor 2.

As best illustrated in Figs. 5 and 6, the entrail removing members 7 are preferably supported in the turret 8, which is formed by a spider 51 and a spider 52 at opposite ends of the turret, which spiders 51 and 52 are fixed to the shaft 13 upon which is mounted the rear sprocket wheel 11 of the conveyor 12. The spiders 51 and 52 are connected together near their periphery by means of a circular series of turret rods 53 parallel to the shaft 13, which turret rods 53 also provide a means for supporting carriers 54 for the entrail removing members 7 and bracket 55 and 56 mounting rotary driving shafts of the entrail removing members 7.

The entrail removing members 7 have shafts 57 passing thru the openings 58 in the carriers 54 of the entrail removing members, there being a carrier 54 for each entrail removing member 7. The openings 58 are larger than the shafts 57 in order to provide in the mechanism, a flexible mounting for the entrail removing members. In the front end of the carriers 54, there are provided sleeves 59 and 60 on the shafts 57, and at the rear end of the carriers 54, there are provided sleeves 61, and said sleeves are brought up tight by springs 62 coiled around the shafts 57, between the auger heads and the sleeve 60 of the entrail removing members. The sleeve 59 has a slightly spherical end where it engages the carriers 54. The construction thus described, permits the entrail removing members 7 or the auger heads to move slightly in the apparatus in order that they may properly enter the visceral cavity of the fish to be cleaned.

Figure 11:
Figure 11 is a diagrammatic view of an entrail removing member and its position within the visceral cavity of a fish.

As illustrated in Figure 11, the visceral cavity of a fish, such as sardine, is located at one side of the center of the fish and if the entrail removing members 7 were rigidly mounted, it would require that the fish be always positioned at the holders 9 of the conveyor 2, with their visceral cavities always in a predetermined position. By providing a flexible mounting for the entrail removing members 7, these members self-position themselves within the visceral cavities when they are advanced into the fish, as such cavities constitute the point of least resistance in the fish.

The shafts 57 are shown as connected by universal connection 63 with a sliding driving shaft 64 which is squared throughout the major portion and fits within the squared end 65 of a shaft 66. The shaft 66, at its rear end, mounts a pinion 67 meshing with a gear 68 which is loosely journaled upon the shaft 13 and rigid with a sprocket wheel 69, having a chain drive from a sprocket wheel 70 on the shaft 41 mounting the belt pulley 40. The construction thus described provides a means by which the augers or entrail removing members 7 may be continuously rotated during operation.

The hollow shafts 66 are journaled in sleeves 71 and the shaft 66 is provided near its front end with a retaining ring 72 for retaining the shaft in fixed axial position with reference to the sleeve 71. As best illustrated in Figures 6 and 8, the sleeves 71 have, near their ends, arms 73 which are pivoted to the turret rods 53, and the arms 73 are yieldingly urged into position to press the pinions 67 against the gear wheel 68, by means which rods 74 and springs 75 are attached to the spider 51.

The carriers 54 for the entrail removing members 7 have tongues engaging within grooves upon a cylinder 76, fixed to the shaft 13 so that the carriers are provided with two points of support to prevent the carriers being revolved on the turret rods 53. The carriers 54 upon their outer ends, mount rollers 78 which work in a cam-way of a cylindrical cam 79 surrounding the turret and fixed to the frame 14.

Figure 12:
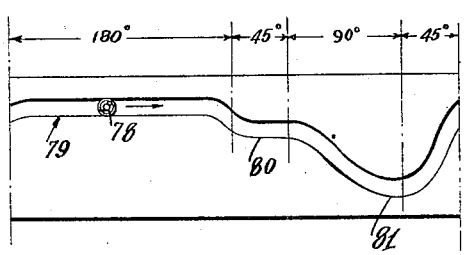
Figure 12 is a development of the cam employed when operating the entrail removing member.
Figure 10:
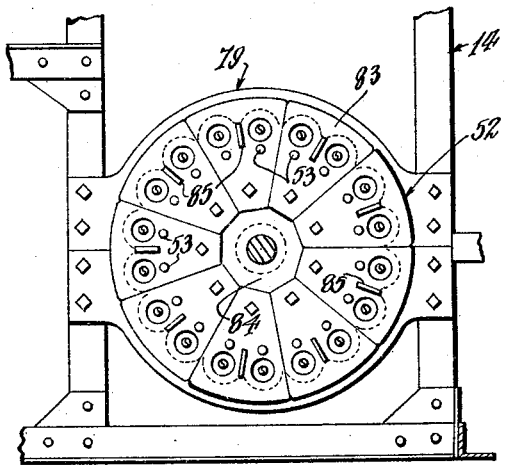
Figure 10 is a front end view of the entrail removing member actuating means on line 10—10 of Figure 5.

As best illustrated in Figure 12, the cam 79 is constructed so that at about 180° of the rotation of the entrail removing turret 8, the entrail removing members 7 are in a retracted position, out of engagement with the fish in the conveyor 2. The cam 79 then has a portion 80 operative for advancing the carriers 54 and the entrail removing members 7 to a position where the entrail removing members engage the ends of the fish within the conveyor 2. For about 45° of rotation of the turret 8, the entrail removing members are held in this position of advance which provides a time in which the entrail removing members 7 may locate themselves with their ends in the visceral cavities of the fish.

A further development 81 of the cam surface then advances the entrail removing members into the visceral cavities of the fish to the advanced position indicated in Figure 11, after which the cam surface is shaped to again retract the entrail removing members 7 to the retracted position.

The front spider 52 of the turret is indicated as built up of a plurality of sections 83 in addition to a hub 84, and the sections 83 of the front spider 52 are provided with lugs 85 in number equal to the number of rods 36 in the rear belt 31 which holds the fish in the conveyor 2 during the entrail removing operations. The lugs 85 project into position to drive the belt 31 by engagement with the rods 36, thus insuring that the motion of the belt 31 will be in accurate synchronism with the motion, both of the conveyor 2 and the entrail removing turret 8. There is also indicated a spray line 86, by means of which water may be sprayed for cleaning the entrail removing members. 87 indicates grease cups for supplying lubricant to the sleeves 71.

In operation, the fish are positioned within the receivers 9 of the conveyor 2 with their heads towards the turret end of the machine. The fish may be fed either by machinery, for example, the feeding machine described in my Patent No. 1,614,588, issued January 18, 1927, may be employed, or the fish may be positioned by hand, in which case, it would be desirable to lengthen somewhat, the forward end of the conveyor in order to provide room for operators.

As the fish pass between the two pairs of continuously revolving knives 3, 4 and 5, 6, the heads and tails of the fish are severed therefrom, and the fish are then continuously advanced to the entrail removing turret 8. As the fish arrive at the entrail removing turret, the entrail removing member of augers 7, first advance until they are in engagement with the ends of the fish at which time the continuously revolving augers seek their way into the visceral cavities of the fish and are then further advanced into said cavities, during which time the entrails of the fish are removed by the augers. The augers 7 are preferably rotated at relatively high speed to whirl the entrails loose from the fish for withdrawal of the augers from the cavities.

Another feature of the present invention resides in the employment of means for severing the heads and tails of the fish which are of an improved form.

The present machine provides a pair of revolving discs having overlapping cutting edges at the point where the heads or the tails are to be severed from the fish and the cutting discs are revolved so that the cutting edges move with the direction of the fish, removing the heads and tails of the fish by a shearing action.

In the preferred form of the machine, the cutting discs of each pair revolve at different speeds, so as to continually present different cutting edges to each other which has the effect of maintaining the discs sharp and facilitates the cutting action.

Also, in the preferred form of the machine, one of the cutting discs, preferably upper, is rotated so that its cutting edge in contact with the fish is moving at about the same speed as the fish, while the cutting edge of the other disc is revolving more rapidly. This action is found to prevent the fish from being squeezed in the cutters in cutting operations, and also to result in a very clean removal of both the heads and tails of the fish. In the prior forms of fish cleaning machines, the form of severing means used had a tendency to crush the fish or to merely tear the head or the tail from the fish.

While the form of the invention described is well adapted to carry out the objects of the present invention, it is understood that various modifications and changes may be made, all within the spirit of the invention and the invention includes all such modifications and changes as come within the scope of the appended claims.

I claim:

1. In a fish cleaning machine, a conveyor having a plurality of individual fish holding members, an entrail removing member, means for actuating the entrail removing member, and means for conveying the entrail removing member to maintain said member in operative position during movement of the fish holding conveyor.

2. In a fish cleaning machine, a moving fish holding member, an entrail removing member, means for moving said removing member in the direction and with the motion of said holding member, and means for actuating the removing member during the movement of said entrail removing member and said holding member.

3. In a fish cleaning machine, a moving fish holding member, an entrail removing member movable axially in cleaning operation, means for moving the axis of said removing member to maintain said axis in substantially fixed position relative to the holding member while the holding member is moving, and means imparting axial movement to said removing member.

4. In a fish cleaning machine, a moving fish holding member, an entrail removing member axially movable and rotatable during fish cleaning operations, means for moving the axis of the entrail removing member during cleaning operations to maintain said axis in fixed position relative to said moving fish holding member, and means for rotating and axially moving said entrail removing member while its axis is moving with motion of said holding member.

5. In a fish cleaning machine, means for holding a plurality of fish, a plurality of entrail removing members, means for moving the holding means and entrail removing members together and in the same direction to permit a plurality of fish to be simultaneously operated upon, and means for actuating the entrail removing members during the simultaneous movement of said members and holding means.

6. In a fish cleaning machine, a moving fish holding member, an entrail removing member, means for moving said entrail removing member in one direction synchronously with the fish holding member, and means for actuating the entrail removing member during said motion to effect a cleaning operation.

7. In a fish cleaning machine, means for moving a plurality of fish, a plurality of entrail removing members, means for moving the members in the direction of and with the motion of the fish moving means, and means for actuating the entrail removing members so each effects a cleaning operation on a fish.

8. In a fish cleaning machine, means for moving a plurality of fish, a plurality of entrail removing members, means for moving the members in the direction of and with the motion of the fish moving means, means for actuating the entrail removing members during said motion into and out of the fish to effect a cleaning operation.

9. In a fish cleaning machine, means for moving a plurality of fish, a plurality of entrail removing members, means for moving the members in the direction of and with the motion of the fish moving means, and means for axially actuating the members during said motion to effect a cleaning operation.

10. In a fish cleaning machine, a moving fish holding member, a plurality of entrail removing members axially movable and rotatable during fish cleaning operations, means for moving the axis of entrail removing members during cleaning operations to maintain said axes in fixed position relative to said moving fish holding member, means for rotating and axially moving said entrail removing members while their axes are moving with the motion of said fish holding member.

11. In a fish cleaning machine, a conveyor having a plurality of individual fish holding members, a plurality of entrail removing members, means for holding said entrail removing members spaced apart the distance of said fish holding members, means for moving said entrail removing members in the direction of and with the motion of the fish holding members during fish cleaning operations, and means for actuating the entrail removing members during said motion.

12. In a fish cleaning machine, a conveyor having the plurality of individual fish holding members, a plurality of entrail removing members, means for holding said members spaced apart the distance of the spacing of said fish holding members, means for moving said entrail removing members in the direction of and with the motion of the fish holding members during cleaning operations, and means for axially moving the entrail removing members into and out of fish in said fish holding members during said movement.

13. In a fish cleaning machine, a conveyor having a plurality of individual fish holding members, a plurality of entrail removing members spaced apart the distance of said fish holding members, means for moving said entrail removing members in the direction of and with the motion of said individual fish holding members, means for axially moving said entrail removing members and for revolving the same during the simultaneous travel of the entrail removing members and fish holding members to cause the entrail removing members to enter and retract from fish in said fish holding members.

14. In a fish cleaning machine, a conveyor having a plurality of individual fish holding members, a turret disposed at one end of said conveyor and mounting a plurality of entrail removing members, means for simultaneously moving said conveyor in said turret to maintain the entrail removing members opposite the fish holding members during cleaning operations, and means for actuating the entrail removing members during said motion.

15. In a fish cleaning machine, a conveyor having a plurality of individual fish holding members, a turret disposed at one end of said conveyor and mounting a plurality of entrail removing members, means for moving the turret in synchronism with the motion of said conveyor, and means during said motion for actuating said entrail removing members to enter fish in said fish holding members.

16. In a fish cleaning machine, a conveyor having a plurality of individual fish holding members, a turret disposed at one end of said conveyor and mounting a plurality of entrail removing members, means for moving the turret in synchronism with the motion of said conveyor, and means during said motion for actuating said entrail removing members to enter fish in said fish holding members, and means for rotating the entrail removing members about their axes during said operations.

17. In a fish cleaning machine, a conveyor having a plurality of individual fish holding members, a turret having a plurality of auger shaped entrail removing members, means for moving the turret in the direction of and with the motion of the conveyor, and means for rotating and axially moving the entrail removing members during said motion to cause the entrail removing members to enter and withdraw from fish in said fish holding members.

18. A fish cleaning machine comprising, a fish holding member, an entrail removing member, means for moving the member into and out of the visceral cavity of the fish in said holding means, and flexible means in one of said members operative to permit the entrail removing member to self-locate itself in the visceral cavity of the fish in said fish holding means.

19. A fish cleaning machine comprising, a fish holding member, an entrail removing member, means for moving the entrail removing member into and out of the visceral cavity of the fish in said fish holding member and for revolving said removing member during said operation and a flexible mounting means in one of said members operative to permit said motion to locate the entrail removing member in said visceral cavity.

20. A fish cleaning machine comprising, a fish holding member, means for moving said member, an entrail removing member, means for moving said member in the direction of and with the motion of the holding member, means for, during said motion, moving the entrail removing member into and out of the fish in said fish holding member, and flexible means in one of said members operative to permit the entrail removing member to self-locate itself within the visceral cavity of the fish in said fish holding member.

21. A fish cleaning machine comprising, an entrail removing member, means for axially moving said member, means for revolving said member, and a yielding means operative to permit said member to self-locate the visceral cavity of a fish.

22. A fish cleaning machine comprising, a conveyor having a plurality of fish holding members, a plurality of entrail removing members, means for moving said entrail removing members in the direction of and with the motion of said conveyor during fish cleaning operations, means for axially moving the entrail removing members during said motion to cause the members to enter fish in said fish holding members, and flexible means operative to permit the entrail removing member to self-align themselves with the visceral cavities of the fish in said fish holding members.

23. A fish cleaning machine comprising, a conveyor having a plurality of fish holding members, a plurality of entrail removing members, means for moving said entrail removing members in the direction of and with the motion of said conveyor during fish cleaning operations, means for axially moving the entrail removing members during said motion to cause the members to enter fish in said fish holding members, and flexible means operative to permit the entrail removing member to self-align themselves with the visceral cavities of the fish in said fish holding members, and means for axially revolving the entrail removing members during fish cleaning operations.

24. A fish cleaning machine comprising, a fish holding member, an entrail removing member, a means for initially advancing said entrail removing member to a fish in said holding member, flexible means to permit the entrail removing member to locate the visceral cavity of the fish, and means for further advancing the entrail removing member into said cavity and withdrawing the same therefrom.

25. A fish cleaning machine comprising, a fish holding member, an entrail removing member and means for automatically actuating said entrail removing member to enter and retract from the visceral cavity of the fish in said fish holding member, said means including means for advancing and holding the entrail removing member; first, for a period of time in contact with the fish and then further advancing the member.

26. A fish cleaning machine comprising, a fish holding member, an entrail removing member and means for automatically actuating said entrail removing member to enter and retract from the visceral cavity of the fish in said fish holding member, said means including means for advancing and holding the entrail removing member; first, for a period of time in contact with the fish and then, further advancing the member, and means for revolving the entrail removing member about its axis during said operation.

27. A fish cleaning machine comprising, a fish holding member, an entrail removing member, means for advancing said entrail removing member while revolving the same about the axis into contact with the fish in said fish holding member, flexible means operative to permit said entrail removing member to locate the visceral cavity of said fish, and means for advancing and retracting the entrail removing member while rotating the same into and from said cavity.

28. A fish cleaning machine comprising, a moving fish holding member, an entrail removing member, means for moving said entrail removing member in the direction of and with the motion of said fish holding member, means for initially advancing the entrail removing member into contact with fish in said holding member during said motion, and means permitting the entrail removing member to automatically locate itself in the visceral cavity of said fish, and means for further advancing and retracting said entrail removing member into and from the visceral cavity of said fish.

29. A fish cleaning machine comprising, a moving fish holding member, an entrail removing member, means for moving said entrail removing member in the direction of and with the motion of said fish holding member, means for initially advancing the entrail removing member into contact with the fish in said holding member during said motion, and means permitting the entrail removing member to automatically locate itself in the visceral cavity of said fish, and means for further advancing and retracting said entrail removing member into and from the visceral cavity of said fish and means for rotating the entrail removing member about its axis during said operations.

30. A fish cleaning machine comprising, a conveyor having a plurality of individual fish holding members, a plurality of entrail removing members, means for mounting said entrail removing members spaced apart the distance of said fish holding members, means for moving said entrail removing members in the direction of and with the motion of said conveyor during fish cleaning operations, means for advancing the entrail removing members during said motion into contact with fish in said fish holding member, and means operative to cause said advance to self-position the entrail removing members in the visceral cavities of the fish.

31. A fish cleaning machine comprising, a conveyor having a plurality of individual fish holding members, a plurality of entrail removing members, means for mounting said entrail removing members spaced apart the distance of said fish holding members, means for moving said entrail removing members in the direction of and with the motion of said conveyor during fish cleaning operations, means for advancing the entrail removing members during said motion into contact with fish in said fish holding member, and means operative to cause said advance to self-position the entrail removing members in the visceral cavities of the fish, and means for revolving the entrail removing members during the fish cleaning operations.

32. In a fish cleaning machine, a conveyor having a plurality of individual fish holding members, a turret providing a plurality of entrail removing members, means for moving the turret in the direction of and with the motion of said conveyor, means for actuating the entrail removing members during said motion, and means operative to permit the entrail removing members to self-locate the visceral cavities of the fish in said conveyor.

33. In a fish cleaning machine, a conveyor having a plurality of individual fish holding members, a turret providing a plurality of entrail removing members, means for moving the turret in the direction of and with the motion of said conveyor, means for actuating the entrail removing members during said motion, and means operative to permit the entrail removing members to self-locate the visceral cavities of the fish in said conveyor, and means for revolving the entrail removing member during the fish cleaning operations.

34. In a fish cleaning machine, a turret having a plurality of entrail removing members, carriers in said turret for said entrail removing members, a cam for axially advancing and retracting the carriers during revolution of said turret and means for revolving the entrail removing members.

35. In a fish cleaning machine, a turret, a plurality of longitudinal slidable carriers upon said turret, a cam engaging said carrier operative to advance and retract the same, an entrail removing member supported by each carrier, to be advanced and retracted thereby.

36. In a fish cleaning machine, a turret, a plurality of longitudinal slidable carriers upon said turret, a cam engaging said carrier operative to advance and retract the same, an entrail removing member supported by each carrier, to be advanced and retracted thereby, and means for rotating the entrail removing members.

Signed at Los Angeles, California, this 22 day of May, 1928.

SEVERIN C. ANKER-HOLTH.